United States Patent
Kato

(10) Patent No.: US 12,118,186 B2
(45) Date of Patent: Oct. 15, 2024

(54) DISPLAY METHOD, DISPLAY APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Fumitaka Kato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/458,197

(22) Filed: Aug. 30, 2023

(65) Prior Publication Data

US 2024/0069691 A1 Feb. 29, 2024

(30) Foreign Application Priority Data

Aug. 30, 2022 (JP) ................. 2022-137084

(51) Int. Cl.
*G06F 3/045* (2006.01)
*G06F 3/0482* (2013.01)
(Continued)

(52) U.S. Cl.
CPC ........ *G06F 3/0482* (2013.01); *G06F 3/04845* (2013.01); *G06F 3/04847* (2013.01); *G06F 3/0486* (2013.01); *G06F 2203/04803* (2013.01)

(58) Field of Classification Search
CPC ......... G06F 2203/04803; G06F 3/0482; G06F 3/04845; G06F 3/04847; G06F 3/0486
See application file for complete search history.

(56) References Cited

U.S. PATENT DOCUMENTS

2013/0083058 A1 4/2013 Yoshimura
2014/0240358 A1 8/2014 Nobori
(Continued)

FOREIGN PATENT DOCUMENTS

JP 2013-078001 A 4/2013
JP 2014-165792 A 9/2014
(Continued)

OTHER PUBLICATIONS

Panasonic Corporation, Geometry Manager Pro Manual, Date May 2021, 23 pgs.

(Continued)

*Primary Examiner* — Insa Sadio
(74) *Attorney, Agent, or Firm* — Dority & Manning, P.A.

(57) ABSTRACT

A display method including: receiving first operation for dividing a region of a first image including a plurality of control points into a plurality of regions including a first region and a second region; receiving second operation for changing a number of control points included in at least one of the first region and the second region; receiving, in the at least one region of the first region and the second region, third operation including selection of one or more control points in the first image and designation of positions after the movement of the one or more control points; correcting a second image based on positions in the first image before the movement of the one or more control points and positions after the movement of the one or more control points in the first image; and causing a display apparatus to display the second image on a display surface.

12 Claims, 15 Drawing Sheets

(51) Int. Cl.
  *G06F 3/04845* (2022.01)
  *G06F 3/04847* (2022.01)
  *G06F 3/0486* (2013.01)

(56) References Cited

U.S. PATENT DOCUMENTS

2020/0193677 A1* 6/2020 Vaganov ................. A63F 13/65
2020/0329221 A1  10/2020 Chien et al.
2021/0056685 A1* 2/2021 Zhang ................... G06T 7/0004
2022/0309967 A1  9/2022 Shishido

FOREIGN PATENT DOCUMENTS

JP  2020-174349 A  10/2020
JP  2022-147132 A  10/2022

OTHER PUBLICATIONS

Panasonic Connect Co., Ltd., Software Applications, 6 pgs.
Epson, Business Projector Epson EB-L30000U/L30002U, 7 pgs.

* cited by examiner

DISPLAY METHOD, DISPLAY APPARATUS, AND NON-TRANSITORY COMPUTER-READABLE STORAGE MEDIUM STORING PROGRAM

The present application is based on, and claims priority from JP Application Serial Number 2022-137084, filed Aug. 30, 2022, the disclosure of which is hereby incorporated by reference herein in its entirety.

BACKGROUND

1. Technical Field

The present disclosure relates to a display method, a display apparatus, and a non-transitory computer-readable storage medium storing a program.

2. Related Art

There has been known an apparatus including a function of correcting local distortion of an image displayed by a display apparatus.

For example, a projector disclosed in JP-A-2013-78001 (Patent Literature 1) divides an image based on image information into a plurality of quadrilateral regions and moves, based on input operation, a selected control point among vertexes of the divided quadrilateral regions. The projector transforms a quadrilateral region including the selected control point before the movement as one of vertexes into a shape including the moved selected control point in vertexes and corrects image information corresponding to the quadrilateral region before the transformation to be fit in the transformed quadrilateral region. Further, the projector can change the number of control points by changing the size of the quadrilateral region.

However, although correction corresponding to a more complicated shape of a projection surface can be performed as the number of control points is larger, more time and labor of a user are required and burden on the user increases as the number of control points is larger. Therefore, there is room of improving convenience of the user.

SUMMARY

A display method of the present disclosure is a display method including: receiving first operation for dividing a region of a first image including a plurality of control points into a plurality of regions including a first region and a second region; receiving second operation for changing a number of control points included in at least one of the first region and the second region; receiving third operation including selection of one or more control points moving in positions in the first image and designation of positions after the movement of the one or more control points in at least one region of the first region and the second region; correcting a second image based on positions in the first image before the movement of the moving one or more control points and positions after the movement of the one or more control points in the first image; and causing a display apparatus to display the second image on a display surface.

A display apparatus of the present disclosure is a display apparatus including: a display panel configured to display an image on a display surface; and one or more processors configured to execute: receiving first operation for dividing a region of a first image including a plurality of control points into a plurality of regions including a first region and a second region; receiving second operation for changing a number of control points included in at least one of the first region and the second region; receiving third operation including selection of one or more control points moving in positions in the first image and designation of positions after the movement of the one or more control points in at least one region of the first region and the second region; correcting a second image based on positions in the first image before the movement of the one or more control points and positions after the movement of the one or more control points in the first image; and causing the display panel to display the second image on the display surface.

A non-transitory computer-readable storage medium storing a program of the present disclosure is a non-transitory computer-readable storage medium storing a program, the program causing a computer to execute: receiving first operation for dividing a region of a first image including a plurality of control points into a plurality of regions including a first region and a second region; receiving second operation for changing a number of control points included in at least one of the first region and the second region; receiving third operation including selection of one or more control points moving in positions in the first image and designation of positions after the movement of the one or more control points in at least one region of the first region and the second region; correcting a second image based on positions in the first image before the movement of the one or more control points and positions after the movement of the one or more control points in the first image; and causing a display apparatus to display the second image on a display surface.

DESCRIPTION OF EMBODIMENTS

1. System Configuration in a First Embodiment

An embodiment of the present disclosure is explained below with reference to the accompanying drawings.

Figure 1:
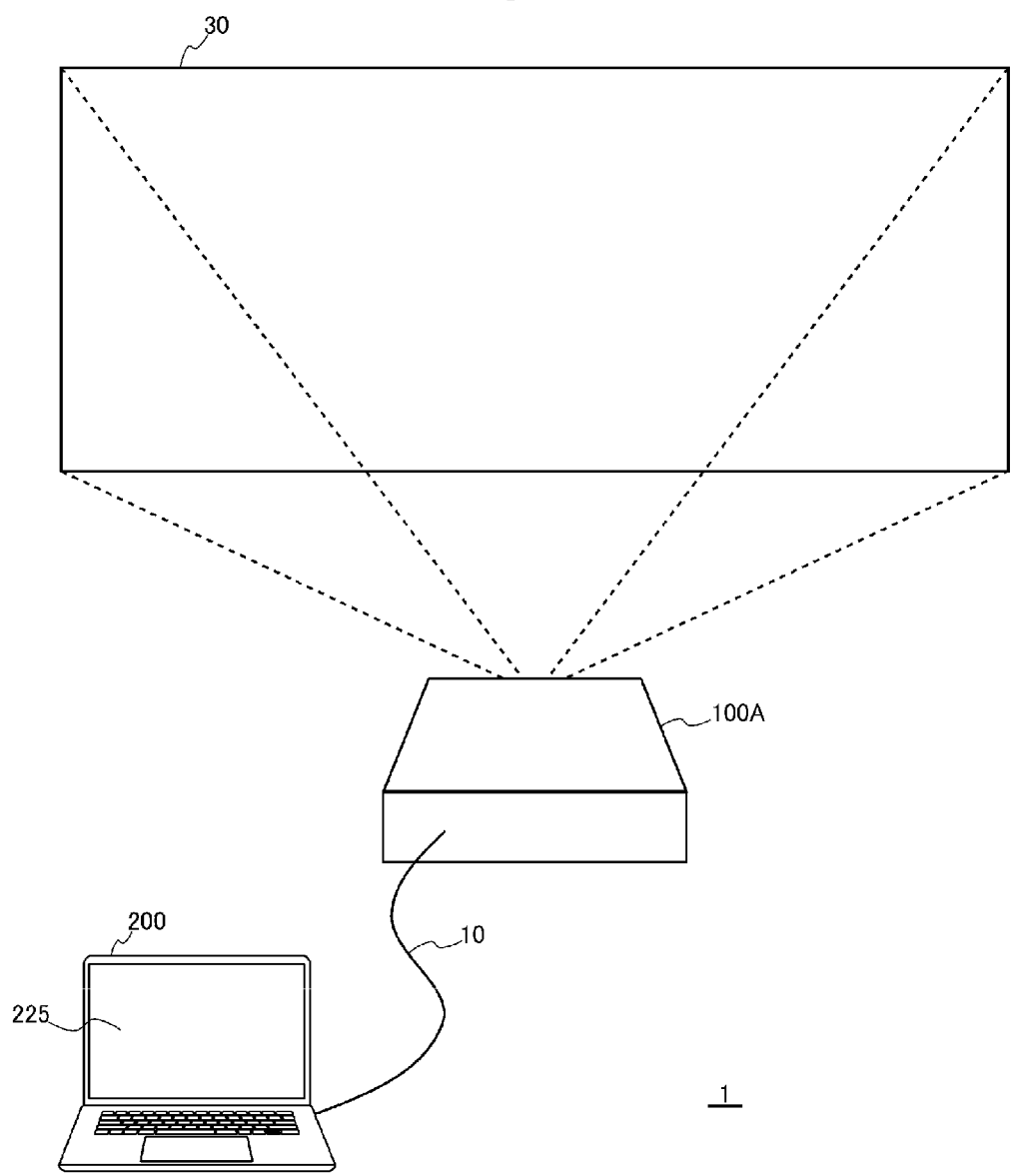
FIG. 1 is a diagram showing a system configuration of a display system.

FIG. 1 is a diagram showing a system configuration of a display system 1.

The display system 1 includes a projector 100A, which is a display apparatus, and an information processing apparatus 200 that supplies a display image that the information processing apparatus 200 causes the projector 100A to display.

The projector 100A and the information processing apparatus 200 are connected by a cable 10. In FIG. 1, a configuration in which the projector 100A and the information processing apparatus 200 are connected by the cable 10 is shown. However, the projector 100A and the information processing apparatus 200 may be connected by radio.

The projector 100A generates image light based on the display image supplied from the information processing apparatus 200. The projector 100A enlarges and projects the generated image light onto a projection surface 30. Consequently, the display image is displayed on the projection surface 30.

The information processing apparatus 200 supplies the display image to the projector 100A and corrects local distortion of the display image that the information processing apparatus 200 causes the projector 100A to display. As the information processing apparatus 200, a personal computer such as a desktop personal computer, a notebook personal computer, or a tablet personal computer is used. A portable terminal such as a smartphone may be used as the information processing apparatus 200.

2. Configuration of the Projector in the First Embodiment

Figure 2:
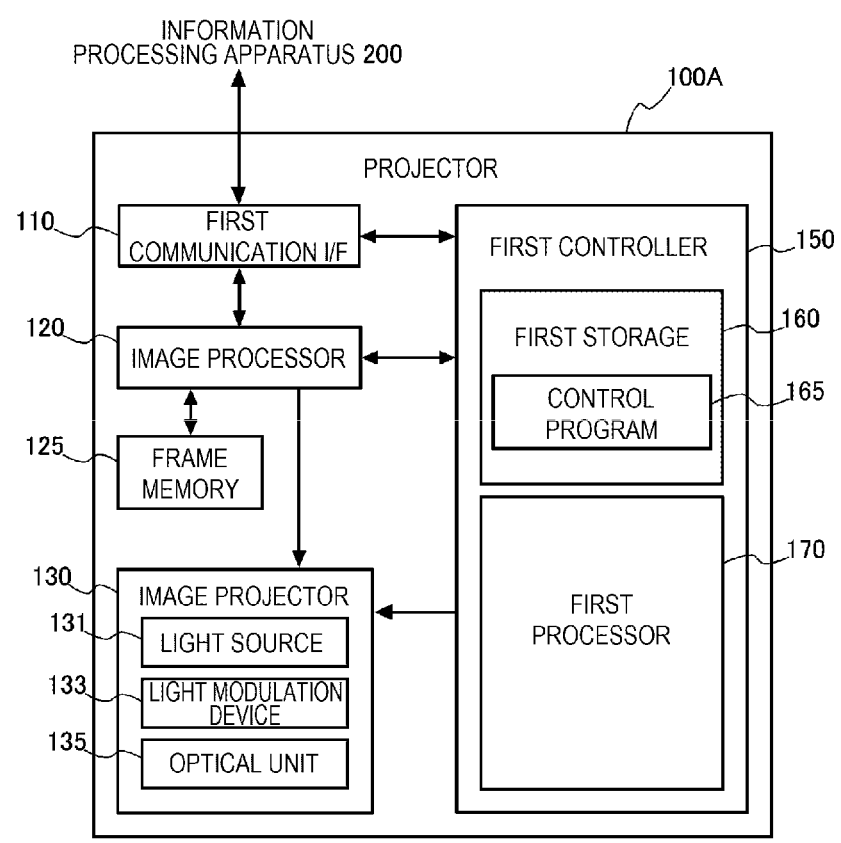
FIG. 2 is a block diagram showing a configuration of a projector in a first embodiment.

FIG. 2 is a block diagram showing a configuration of the projector 100A.

The configuration of the projector 100A is explained with reference to FIG. 2.

The projector 100A includes a first communication interface 110, an image processor 120, a frame memory 125, an image projector 130, and a first controller 150. In the following explanation, interface is abbreviated as I/F. The image projector 130 is equivalent to a display.

The first communication I/F 110 is connected to the information processing apparatus 200 via the cable 10 and performs data communication with the information processing apparatus 200. The first communication I/F 110 is, for example, a wired interface including a connection terminal such as a USB (Universal Serial Bus) connector or an Ethernet connector and an interface circuit. Ethernet is a registered trademark. The first communication I/F 110 may be a wireless communication interface.

The frame memory 125 is connected to the image processor 120. The frame memory 125 includes a plurality of banks. The banks have a storage capacity for enabling writing of a display image for one frame. The frame memory 125 is configured by, for example, an SDRAM (Synchronous Dynamic RAM). The image processor 120 loads a display image input from the first communication I/F 110 in the frame memory 125.

The image processor 120 performs image processing on the display image loaded in the frame memory 125. The image processing performed by the image processor 120 includes, for example, resolution conversion processing or resize processing, correction of distortion aberration, shape correction processing, digital zoom processing, and adjustment of a tint and luminance of an image. The image processor 120 executes processing designated by the first controller 150 and performs, according to necessity, processing using parameters input from the first controller 150. The image processor 120 is naturally capable of executing a plurality of kinds of image processing among the kinds of processing explained above in combination.

The image processor 120 and the frame memory 125 are configured by, for example, an integrated circuit. The integrated circuit includes an LSI (Large Scale Integration), an ASIC (Application Specific Integrated Circuit), a PLD (Programmable Logic Device), an FPGA (Field-Programmable Gate Array), and an SoC (System-on-a-chip). An analog circuit may be included in a part of a configuration of the integrated circuit. The first controller 150 and the integrated circuit may be combined.

The image projector 130 includes a light source 131, a light modulation device 133, and an optical unit 135.

The light source 131 includes a discharge-type light source lamp such as an ultrahigh pressure mercury lamp or a metal halide lamp or a solid-state light source such as a light emitting diode or a semiconductor laser. Light emitted from the light source 131 is made incident on the light modulation device 133.

The light modulation device 133 includes, as a light modulation element that modulates the light emitted from the light source 131, a transmissive liquid crystal panel in which liquid crystal is encapsulated between a pair of transparent substrates. Illustration of the liquid crystal panel is omitted. The liquid crystal panel includes a panel region formed by a plurality of pixels arrayed in a matrix. The light modulation device 133 applies, to the pixels of the panel region, a driving voltage corresponding to a display image input from the image processor 120 and changes light transmittance of the pixels to transmittance corresponding to the display image. The light emitted from the light source 131 is transmitted through the liquid crystal panel to be modulated and image light corresponding to the display image is generated. The light modulation device 133 and the liquid crystal panel are an example of the display panel.

The light modulation element included in the light modulation device 133 is not limited to the transmissive liquid crystal panel and may be, for example, a reflective liquid crystal panel or may be a DMD (Digital Micromirror Device). In this case, the DMD is an example of the display panel.

The optical unit 135 includes a not-shown projection lens and enlarges and projects image light modulated by the light modulation device 133 onto the projection surface 30. Consequently, a display image, which is an image corresponding to the image light, is displayed on the projection surface 30.

The first controller 150 is a computer device including a first storage 160 and a first processor 170.

The first storage 160 includes a RAM (Random Access Memory) and a ROM (Read Only Memory). The RAM is used for temporary storage of various data and the like. The ROM stores a control program 165 for controlling an operation of the projector 100A, various kinds of setting information, and the like.

The first processor 170 is an arithmetic processing device configured by a CPU (Central Processing Unit) or an MPU (Micro Processing Unit). The first processor 170 executes a control program to control the units of the projector 100A.

The first processor 170 may be configured by a single processor or can also be configured by a plurality of processors. The first processor 170 may be configured by an SoC (System-on-a-chip) integrated with a part or the entire first storage 160 and other circuits. The first processor 170 may be configured by a combination of a CPU that executes a program and a DSP (Digital Signal Processor) that executes predetermined arithmetic processing. Further, all of functions of the first processor 170 may be implemented in hardware or may be configured using a programmable device.

Figure 3:
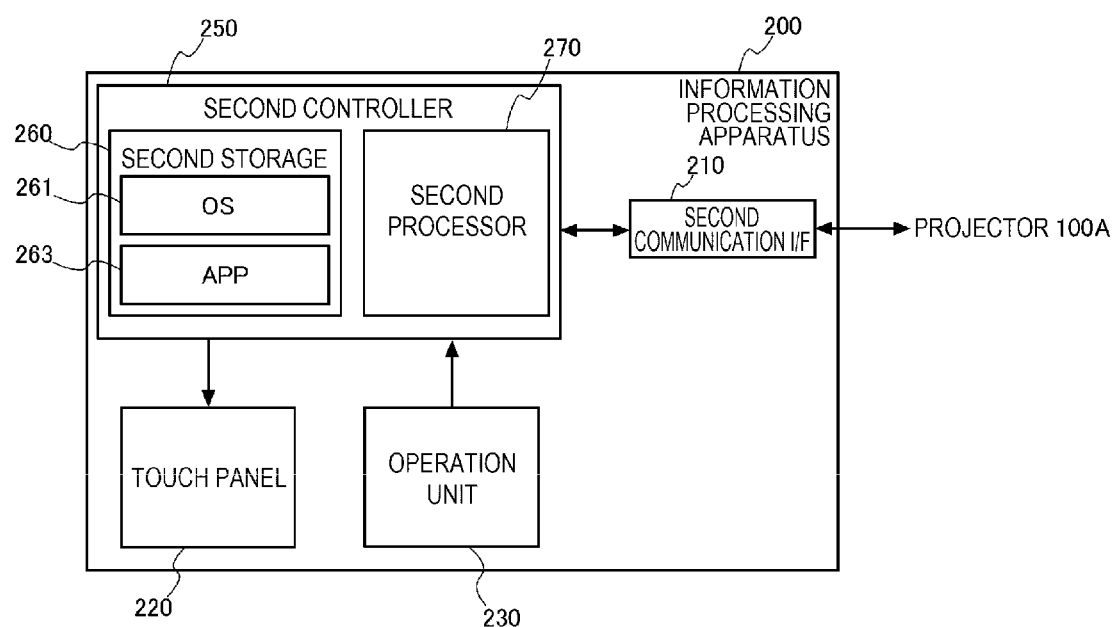
FIG. 3 is a block diagram showing a configuration of an information processing apparatus.

3. Configuration of the Information Processing Apparatus in the First Embodiment FIG. 3 is a block diagram showing a configuration of the information processing apparatus 200.

The configuration of the information processing apparatus 200 is explained with reference to FIG. 3.

The information processing apparatus 200 includes a second communication I/F 210, a touch panel 220, an operation unit 230, and a second controller 250. The second controller 250 is equivalent to the controller.

The second communication I/F 210 is, for example, a wired interface including a connection terminal such as a USB connector or an Ethernet connector and an interface circuit. The second communication I/F 210 performs data communication with the projector 100A via the cable 10.

The touch panel 220 includes a display panel and a touch sensor. Illustration of the display panel and the touch sensor is omitted.

As the display panel, for example, a liquid crystal panel or an organic EL (Electro Luminescence) panel is used.

The touch sensor detects touch operation on the display panel. The touch sensor detects the touch operation in a position of the display panel touched by a pointer such as an electronic pen or a finger of the user. The touch sensor outputs, to the second controller 250, an operation signal including coordinate information indicating the position of the display panel where the touch operation is detected.

The operation unit 230 includes input devices such as a mouse and a keyboard and receives operation of the user. The operation unit 230 outputs, to the second controller 250, an operation signal corresponding to the received operation.

The second controller 250 includes a second storage 260 and a second processor 270.

The second storage 260 includes a RAM and a ROM. The second storage 260 may include an auxiliary storage device such as an SSD (Solid State Drive) or a HDD (Hard Disk Drive).

The RAM is used for temporary storage of various data and the like. The ROM stores control programs such as an OS (Operating System) 261 and application programs 263 for controlling operations of the information processing apparatus 200 and various kinds of setting information. The application programs 263 are hereinafter described as APP 263.

The second processor 270 is an arithmetic processing device configured by a CPU or an MPU. The second processor 270 executes the OS 261 and the APP 263 to control the units of the information processing apparatus 200. The second processor 270 may be configured by a single processor or can also be configured by a plurality of processors.

The second controller 250 that executes the APP 263 includes a point correction function for correcting local distortion of a display image that the second controller 250 causes the projector 100A to display.

The second controller 250 generates a correction parameter for correcting, with the point correction function, the display image that the second controller 250 causes the projector 100A to display. The second controller 250 corrects the display image using the generated correction parameter and transmits the corrected display image to the projector 100A.

An operation of the second controller 250 for generating the correction parameter is explained below.

In order to generate the correction parameter, first, the second controller 250 causes the touch panel 220 of the information processing apparatus 200 to display a pattern image 300 equivalent to the first image.

Figure 4:
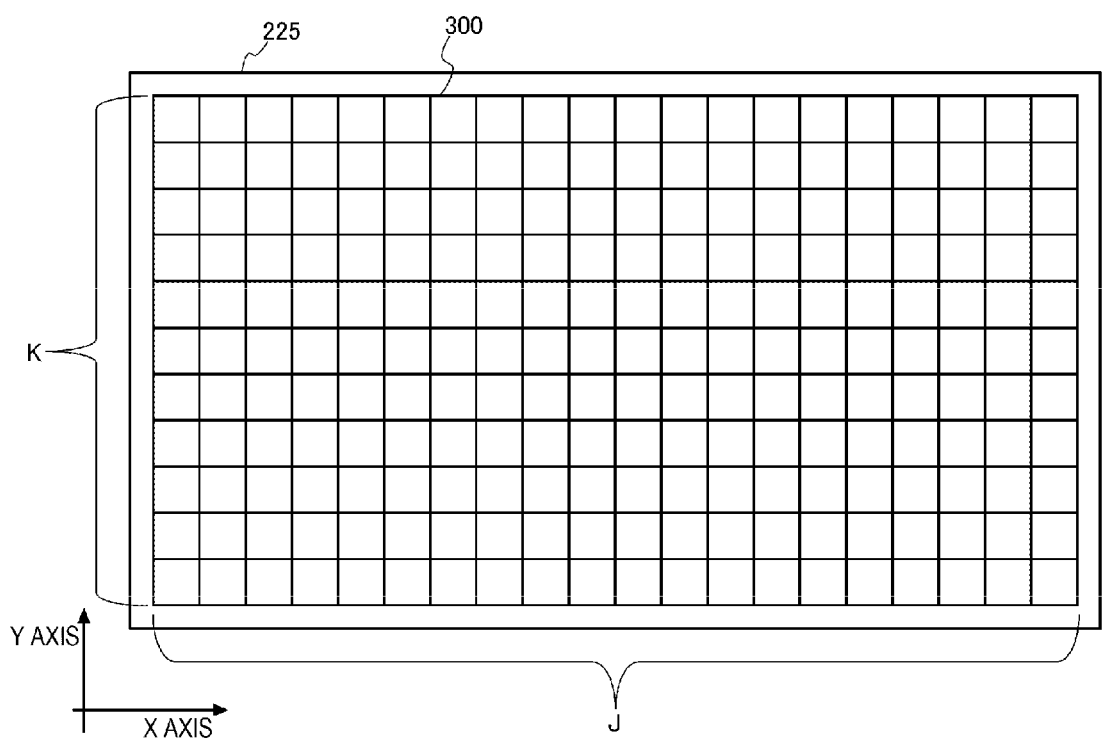
FIG. 4 is a diagram showing an example of a pattern image displayed on an application screen.

FIG. 4 is a diagram showing an example of the pattern image 300 displayed on an application screen 225.

The application screen 225 is a screen displayed on the touch panel 220 when the second controller 250 executes the APP 263.

An X axis shown in FIG. 4 is an axis parallel to the lateral direction of the touch panel 220 and a Y axis is an axis parallel to the longitudinal direction of the touch panel 220.

The pattern image 300 is a rectangular image. J line segments are arranged at equal intervals in the X-axis direction of the pattern image 300. K line segments are arranged at equal intervals in the Y-axis direction of the pattern image 300. J and K are any natural numbers.

Control points are set at intersections of the J line segments arranged in the X-axis direction of the pattern image 300 and the K line segments arranged in the Y-axis direction of the pattern image 300. The control points are points where positions on the pattern image 300 can be changed by touch operation performed by the user or operation of the operation unit 230 in point correction. The correction parameter is generated based on the positions on the pattern image 300 of the control points before the change of the positions and the positions on the pattern image 300 of the control points after the change of the positions.

After causing the application screen 225 to display the pattern image 300, the second controller 250 receives region setting operation for dividing a region of the pattern image 300 into a plurality of regions including a first region 310 and a second region 320. The region setting operation is equivalent to the first operation.

In this embodiment, for simplification of explanation, a case is explained in which the pattern image 300 is set in two regions of the first region 310 and the second region 320. The region setting operation may be operation for dividing the pattern image 300 into three or more regions including the first region 310, the second region 320, and a third region.

The user sets the first region 310 and the second region 320 based on the shape of the projection surface 30. Specifically, the user operates the touch panel 220 or the operation unit 230 of the information processing apparatus 200 while visually recognizing the shape of the projection surface 30 and divides the pattern image 300 into the first region 310 and the second region 320. For example, assuming that the pattern image 300 is displayed on the projection surface 30 when a complicated shape such as a curved surface or a convex shape is included in a part of the projection surface 30, the user divides the pattern image 300 into the first region 310 and the second region 320 such that a region of the complicated shape of the projection surface 30 is included in the second region 320.

Figure 5:
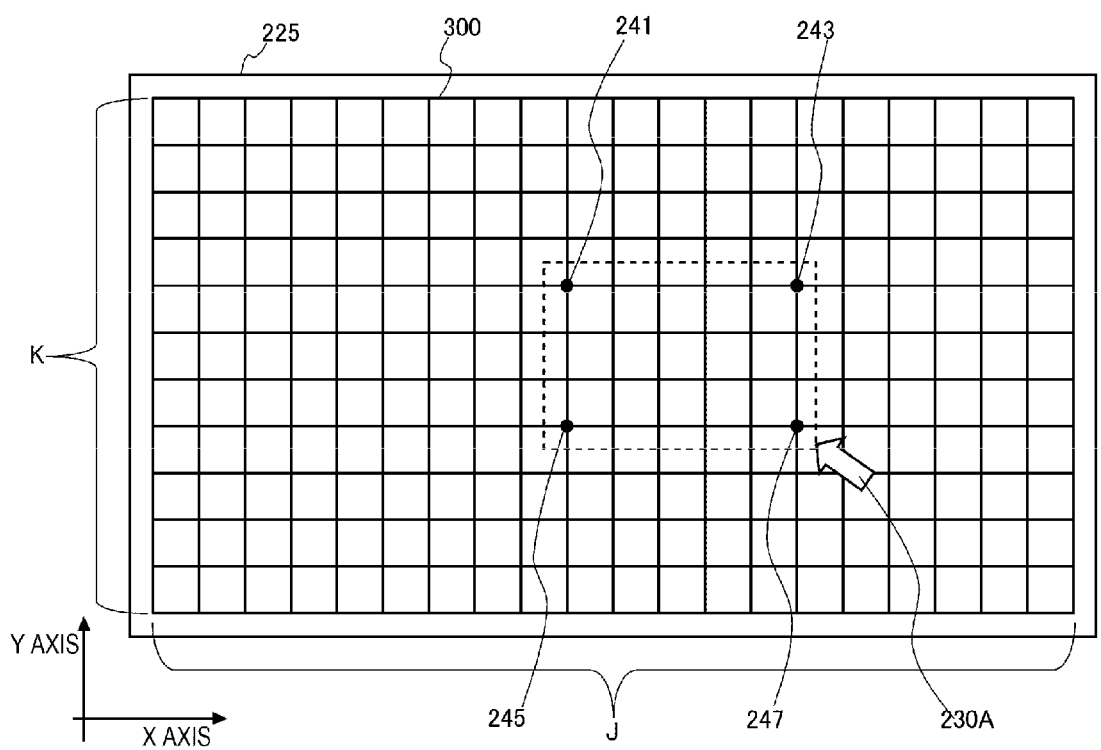
FIG. 5 is a diagram showing region setting operation by mouse operation.

FIG. 5 is a diagram showing region setting operation by mouse operation.

Figure 6:
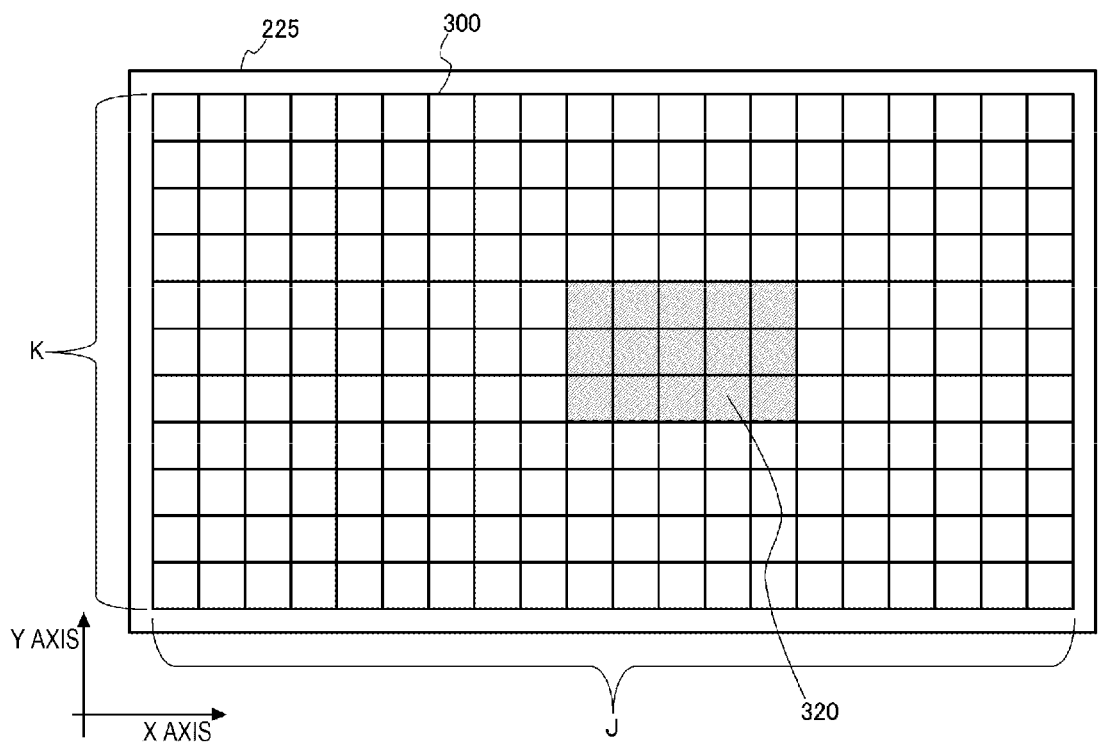
FIG. 6 is a diagram showing a second region set by the mouse operation.

FIG. 6 is a diagram showing the second region 320 set by the mouse operation.

The region setting operation may be, for example, as shown in FIG. 5, operation of the user dragging the mouse of the operation unit 230 and moving a cursor 230A to surround all control points included in a region set as the second region 320. The region setting operation may be, for example, operation of the user touching the touch panel 220 with a finger and moving the touching finger to surround all the control points included in the region set as the second region 320.

When drag operation of the mouse is input, the second controller 250 sets the second region 320 based on the input drag operation.

The second controller 250 detects control points located in the uppermost left, the uppermost right, the lowermost left, and the lowermost right among the control points included in the region surrounded by the drag operation. In FIG. 5, the control point located in the upper left is indicated by a black circle 241, the control point located in the upper right is indicated by a black circle 243, the control point located in the lower left is indicated by a black circle 245, and the control point located in the lower right is indicated by a black circle 247. The second controller 250 sets the second region 320 having, as four vertexes, the detected positions of the control points located in the upper left, the upper right, the lower left, and the lower right.

Figure 7:
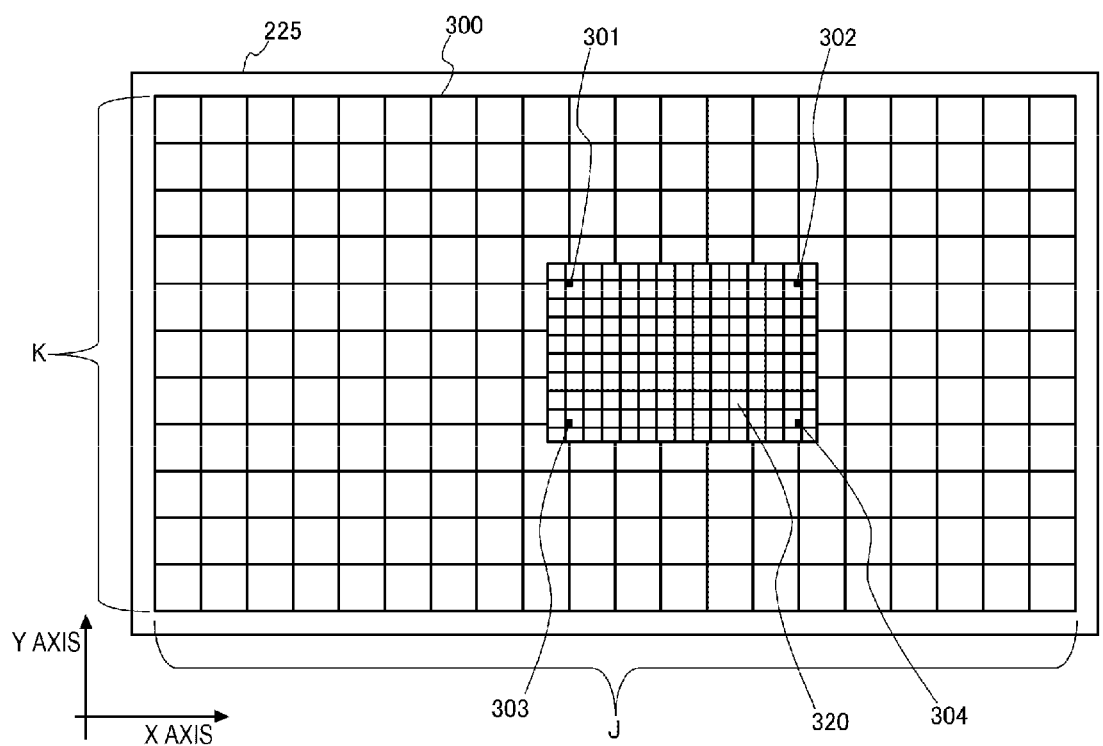
FIG. 7 is a diagram showing an example of unpreferable setting of the second region.

FIG. 7 is a diagram showing an example of unpreferable setting of the second region 320.

FIG. 7 shows an example in which the region surrounded by the drag operation of the mouse is set as the second region 320. In this case, the vertexes of the second region 320 do not coincide with the control points of the first region 310. Therefore, the control points located at the vertexes of the second region 320 and the control points of the first region 310 do not coincide.

When the vertexes of the second region 320 coincide with the control points of the first region 310 as shown in FIG. 6, the positions of the control points of the first region 310 and the second region 320 can be simultaneously changed. However, if the positions of the vertexes of the second region 320 deviate from the positions of the control points of the first region 310 as shown in FIG. 7, the number of the control points of the first region 310 that are hidden by the second region 320 and cannot be changed in position increases. Black squares 301, 302, 303, and 304 shown in FIG. 7 indicate the control points of the first region 310 that are hidden by the second region 320 and cannot be changed in position.

Figure 8:
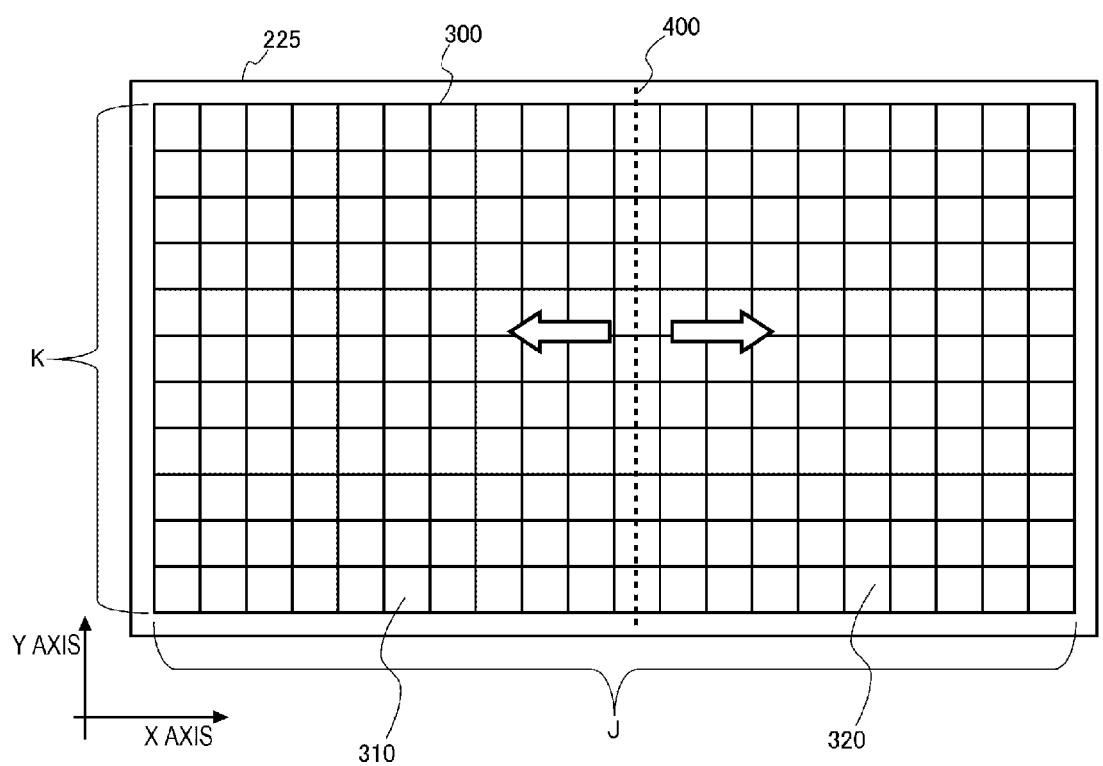
FIG. 8 is a diagram showing an auxiliary line displayed on the application screen.

FIG. 8 is a diagram showing an auxiliary line 400 displayed on the application screen 225.

The region setting operation may be operation for causing the application screen 225 to display the auxiliary line 400 parallel to the X axis or the Y axis and changing a display position of the auxiliary line 400 with touch operation or drag operation by the mouse. A line indicated by a broken line in FIG. 8 corresponds to the auxiliary line 400. It is assumed that, in FIG. 8, a region of the pattern image 300 further on the left side than the auxiliary line 400 in the drawing view is set as the first region 310 and a region of the pattern image 300 further on the right side than the auxiliary line 400 in the drawing view is set as the second region 320. The user operates the mouse of the operation unit 230 to place the cursor 230A on the auxiliary line 400 and moves, with drag operation, the display position of the auxiliary line 400 in the right direction or the left direction in the drawing view as indicated by arrows in FIG. 8. Consequently, a range of the first region 310 and a range of the second region 320 in the pattern image 300 are changed.

The movement of the display position of the auxiliary line 400 is not limited to this method. For example, the display position of the auxiliary line 400 may be changed by operation of the keyboard of the operation unit 230. More specifically, the user may press a key corresponding to a direction in which the user desires to move the auxiliary line 400 among direction keys included in the keyboard to move the position of the auxiliary line 400 in the corresponding direction by a predetermined amount. The predetermined amount is, for example, the distance between control points adjacent to each other in the X-axis direction or the Y-axis direction.

The display position of the auxiliary line 400 may be set by selecting any one control point with touch operation or click operation of the mouse. For example, the auxiliary line 400 may be set in a position passing the selected control point. In this case, a region including the selected control point and including all control points located further on the right side than the selected control point is set as the second region 320. A region including the selected control point and including all control points located further on the left side than the selected control point may be set as the first region 310. Since the auxiliary line 400 cannot be set in a position for dividing the first region 310 and the second region 320, the control points located at the vertexes of the pattern image 300 may not be able to be set as the display position of the auxiliary line 400.

Figure 9:
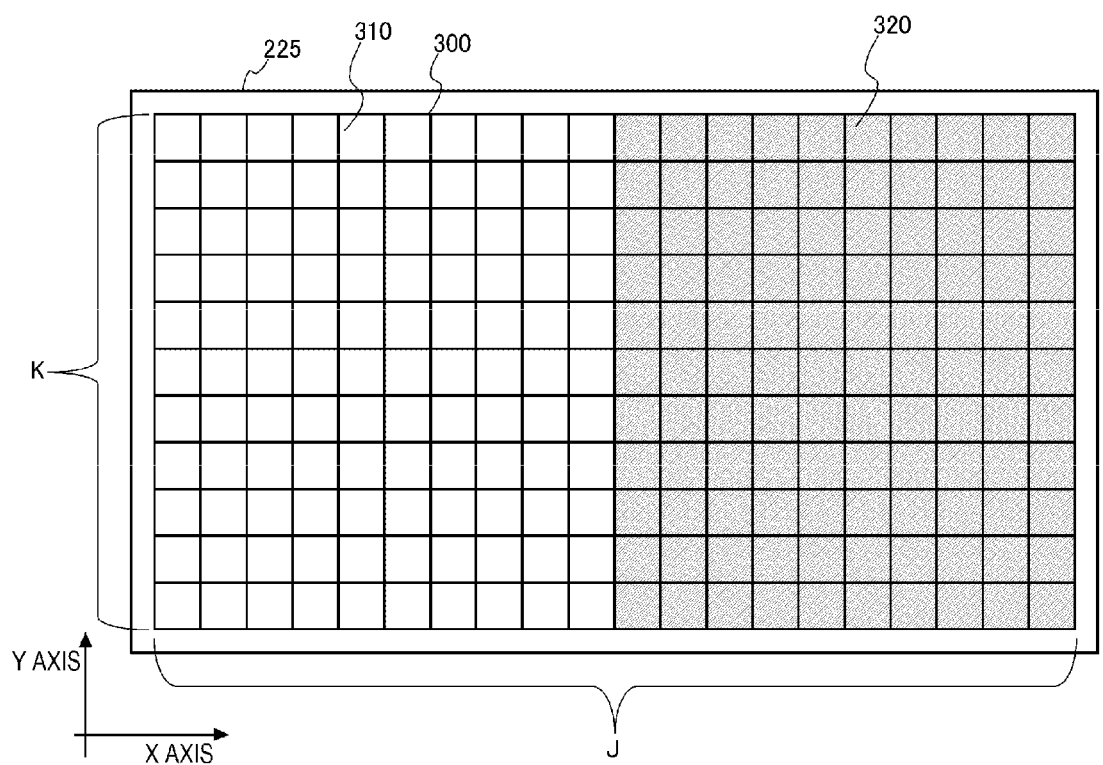
FIG. 9 is a diagram showing a first region and the second region set by the region setting operation.
Figure 10:
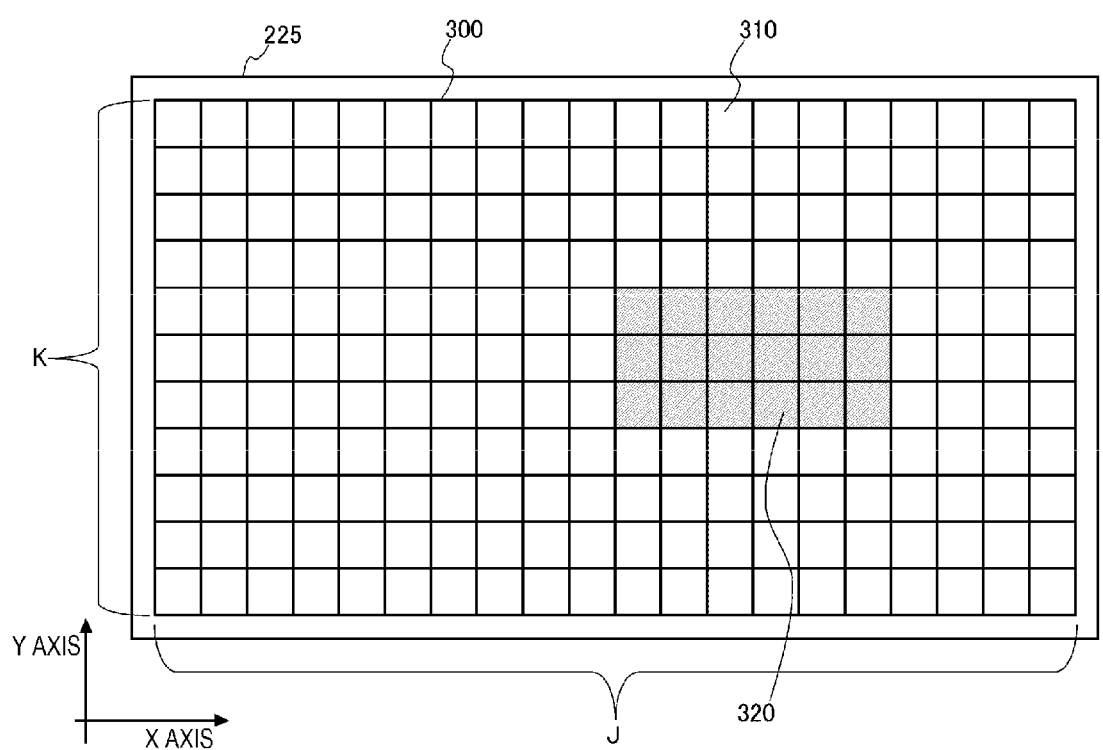
FIG. 10 is a diagram showing the first region and the second region set by the region setting operation.

FIGS. 9 and 10 are diagrams showing the first region 310 and the second region 320 set by the region setting operation. In FIGS. 9 and 10, a range of the pattern image 300 corresponding to the second region 320 is shown with hatching applied thereto.

FIG. 9 shows an example in which the pattern image 300 is divided into two regions of the first region 310 and the second region 320 in a direction parallel to the Y axis. The example shown in FIG. 9 indicates an example in which a region on the left side of the pattern image 300 in the drawing view is set as the first region 310 and a region on the right side of the pattern image 300 in the drawing view is set as the second region 320.

FIG. 10 shows an example in which the pattern image 300 is divided into the first region 310 and the second region 320 such that the second region 320 is surrounded by the first region 310.

After dividing the region of the pattern image 300 into the first region 310 and the second region 320, the second controller 250 changes a display form of the first region 310 and the second region 320.

For example, the second controller 250 may display, in different colors, line segments included in the first region 310 and line segments included in the second region 320.

The second controller 250 may display, in different colors, the entire region of the first region 310 and the entire region of the second region 320.

The second controller 250 may arrange figures such as circles, polygons, or star shapes in the positions of the control points included in the pattern image 300 and change at least one of a shape, a color, and a size of the figures in the first region 310 and the second region 320.

Subsequently, the second controller 250 receives operation for changing the number of control points. The number changing operation is operation for changing the number of control points included in at least one of the first region 310 and the second region 320. The number changing operation is equivalent to the second operation.

First, the second controller 250 receives region selection operation for selecting one of the first region 310 and the second region 320. When one of the first region 310 and the second region 320 is selected, the second controller 250 displays an operation menu for changing the number of control points included in the selected first region 310 or second region 320. In the operation menu, for example, an input field for inputting the number of control points of the selected first region 310 or second region 320 may be displayed. The user inputs the number of control points in the X-axis direction and the number of control points in the Y-axis direction to the input field for the number of control points with touch operation or operation of the keyboard or the mouse.

The second controller 250 may display, as the operation menu, a preset list of the numbers of control points in the X-axis direction and the numbers of control points in the Y-axis direction. The user selects one number from the list of the numbers of control points displayed in the operation menu.

Figure 11:
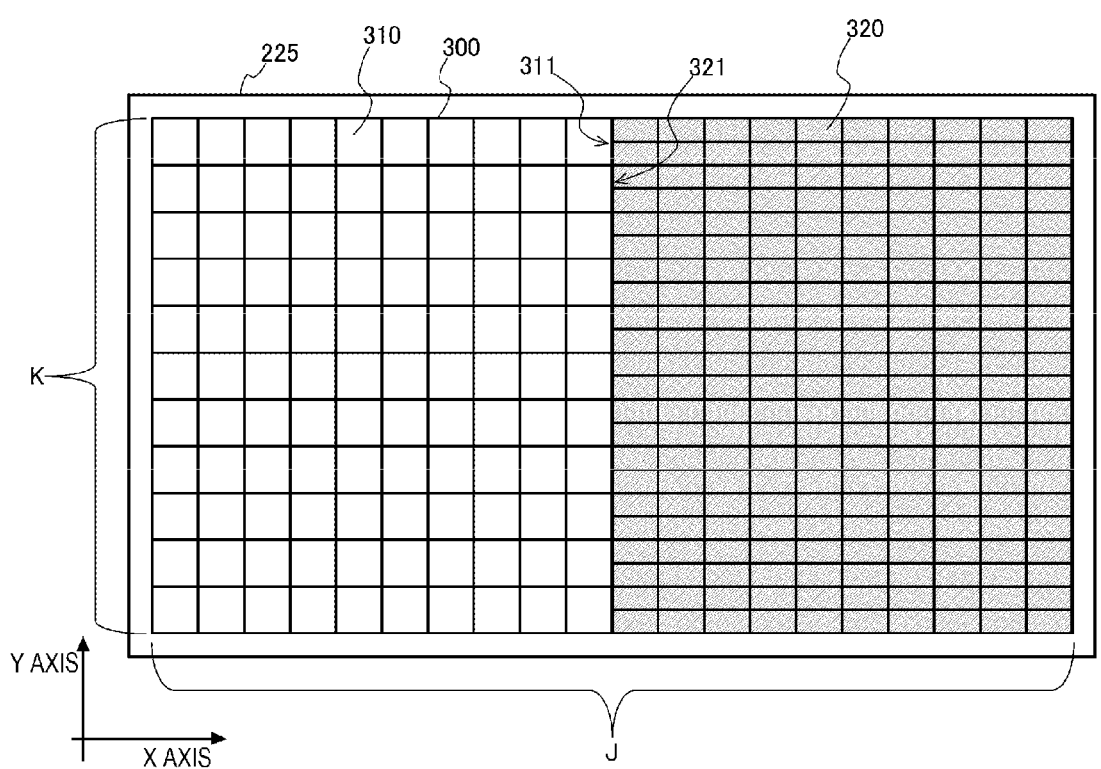
FIG. 11 is a diagram showing the second region in which a number of control points is changed.
Figure 12:
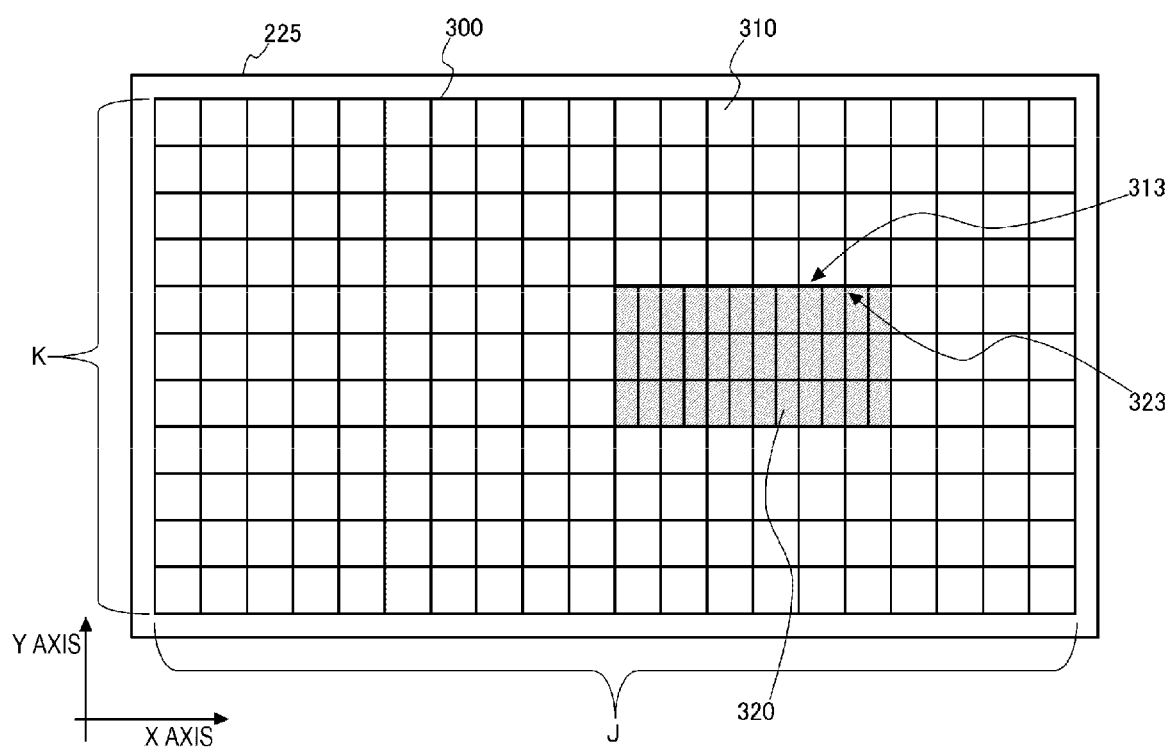
FIG. 12 is a diagram showing the second region in which the number of control points is changed.

FIGS. 11 and 12 are diagrams showing the second region 320 after the change of the number of control points.

FIG. 11 shows a state after the number of control points of the second region 320 of the pattern image 300 shown in FIG. 9 is changed. More specifically, in FIG. 11, an example is shown in which the number of control points in the Y-axis direction of the second region 320 is increased to be larger than the number of control points in the Y-axis direction of the first region 310.

The first region 310 is in contact with the second region 320 in a right side 311 of the first region 310 in the drawing view. That is, the right side 311 is a boundary line between the first region 310 and the second region 320. The right side 311 of the first region 310 is equivalent to the first side.

The second region 320 is in contact with the first region 310 in a left side 321 of the second region 320 in the drawing view. That is, the left side 321 is a boundary line between the second region 320 and the first region 310. The left side 321 of the second region 320 is equivalent to the second side.

The number of control points on the right side 311 of the first region 310 is twelve. The number of control points on the left side 321 of the second region 320 is twenty-three.

When the operation for changing the number of control points is input, the second controller 250 counts the number of control points on a side where the first region 310 and the second region 320 are in contact and determines whether a relation of Expression (1) shown below is satisfied.

$$N=TM-1 \text{ or } M=TN-1 \tag{1}$$

A variable N shown in Expression (1) indicates the number of control points on the left side 321 that is the side of the second region 320 in contact with the first region 310.

A variable M shown in Expression (1) indicates the number of control points on the right side 311 that is the side of the first region 310 in contact with the second region 320.

T shown in Expression (1) is any natural number.

In the example shown in FIG. 11, the number of control points on the right side 311 of the first region 310 is twelve and the number of control points on the left side 321 of the second region 320 is twenty-three. Therefore, a value of T is 2.

The second controller 250 receives the operation for changing the number of control points when the number of control points on the right side 311 of the first region 310 and the number of control points on the left side 321 of the second region 320 satisfy Expression (1) described above. The second controller 250 does not receive the operation for changing the number of control points when the number of control points on the right side 311 of the first region 310 and the number of control points on the left side 321 of the second region 320 do not satisfy Expression (1) described above. That is, the number of control points of the second region 320 is not changed.

In FIG. 11, the number of control points of the second region 320 is increased. However, the operation for changing the number of control points may be operation for reducing the number of control points of the second region 320 to be smaller than the number of control points of the first region 310.

In this case, the second controller 250 determines whether the number of control points on the right side 311 of the first region 310 and the number of control points on the left side 321 of the second region 320 satisfy a relation of Expression (2).

$$M=TN-1 \tag{2}$$

The second controller 250 receives the operation for changing the number of control points when the number of control points on the right side 311 of the first region 310 and the number of control points on the left side 321 of the second region 320 satisfy Expression (2) described above. The second controller 250 does not receive the operation for changing the number of control points when the number of control points on the right side 311 of the first region 310 and the number of control points on the left side 321 of the second region 320 do not satisfy Expression (2) described above.

In FIG. 11, an example is shown in which the pattern image 300 is divided into the first region 310 and the second region 320 by a line segment parallel to the Y axis. However, the pattern image 300 may be divided into the first region 310 and the second region 320 by a line segment parallel to the X axis.

In the example shown in FIG. 11, the number of control points of the second region 320 is changed. However, the number changing operation may be operation for increasing or reducing the number of control points of the first region 310.

When operation for increasing the number of control points of the first region 310 is input as the operation for changing the number of control points, the second controller 250 determines whether the number of control points on the right side 311 of the first region 310 and the number of control points on the left side 321 of the second region 320 satisfy Expression (2) described above.

When operation for reducing the number of control points of the first region 310 is input as the operation for changing the number of control points, the second controller 250 determines whether the number of control points on the right side 311 of the first region 310 and the number of control points on the left side 321 of the second region 320 satisfy Expression (1) described above.

FIG. 12 shows a state after the number of control points of the second region 320 of the pattern image 300 shown in FIG. 10 is changed. Specifically, in FIG. 12, an example is shown in which the number of control points in the X-axis direction of the second region 320 included in the first region 310 is changed.

In the example shown in FIG. 12, a boundary line between the first region 310 and the second region 320 is a line segment 313 of the first region 310 and is an upper side 323 of the second region 320.

The number of control points on the line segment 313 of the first region 310 is seven. The number of control points on the upper side 323 of the second region 320 is thirteen.

Even when the second region 320 is surrounded by the first region 310, the second controller 250 does not receive the input number changing operation when the relation of Expression (1) or (2) described above is not satisfied.

In the example shown in FIG. 12, 13=2×7−1, which satisfies the relation of Expression (1).

When the numbers of control points of the first region 310 and the second region 320 after the number changing operation is input do not satisfy the relation of Expression (1) or (2) described above, the second controller 250 may cause a notifier to execute a notification operation.

For example, the second controller 250 may use the touch panel 220 as the notifier and cause the touch panel 220 to display notification indicating that the number changing operation is not received. When the information processing apparatus 200 includes a speaker, the second controller 250 may use the speaker as the notifier. The second controller 250 may output, from the speaker, voice indicating that the number changing operation is not received.

When operation for changing the numbers of control points of both of the first region 310 and the second region 320 is input, the second controller 250 does not receive the number changing operation when the relation of Expression (1) or (2) described above is not satisfied.

In this case, when the operation for changing the number of control points of the first region 310 and the operation for changing the number of control points of the second region 320 are input and, thereafter, decision operation is received, the second controller 250 determines whether the relation of Expression (1) or (2) described above is satisfied.

When receiving the operation for changing the number of control points of at least one of the first region 310 and the second region 320, subsequently, the second controller 250 receives control point selection operation.

The control point selection operation includes operation including selection of control points moving in positions on the pattern image 300 and designation of positions after the movement of the selected moving control points in at least one region of the first region 310 and the second region 320. The operation including the selection of control points and designation of positions after the movement of the control points is equivalent to the third operation.

The user selects control points, positions of which are changed, with touch operation or operation of the mouse according to the shape such as the curved surface or the convex shape of the projection surface 30.

For example, the user touches a control point, the position of which the user desires to move. Subsequently, without lifting the touching finger from the touch panel 220, the user moves the control point to a position to which the user desires to move the control point. After moving the finger to the position to which the user desires to move the control point, the user lifts the finger touching the touch panel 220 from the touch panel 220. The same applies to the operation of the mouse.

When the finger of the user is lifted from the touch panel 220, the second controller 250 causes the second storage 260 to store a coordinate before the movement of the control point and a coordinate after the movement of the control point. The coordinate is a coordinate in a coordinate system set in the pattern image 300 and is a coordinate indicating a position on the pattern image 300.

The user performs the control point selection operation at all control points, the positions of which on the pattern image 300 the user desires to move. After inputting the control point selection operation at all control points, the positions of which on the pattern image 300 the user desires to move, the user inputs instruction operation for instructing execution of point correction. For example, a button corresponding to the instruction operation for the point correction is displayed on the application screen 225. When the user presses the button, the instruction operation for the point correction is input. The control points selected by the control point selection operation are hereinafter referred to as selected control points.

When the instruction operation for the point correction is input, the second controller 250 generates a correction parameter based on coordinates before movement and coordinates after the movement of the selected control points. The second controller 250 generates a first correction parameter based on coordinates before movement and coordinates after the movement of the selected control points included in the first region 310. The second controller 250 generates a second correction parameter based on coordinates before movement and coordinates after the movement of the selected control points included in the second region 320.

Subsequently, the second controller 250 divides a region of a display image, which is an image that the second controller 250 causes the projector 100A to display. The display image is equivalent to the second image.

The second controller 250 divides the display image into a third region and a fourth region based on the setting of the first region 310 and the second region 320 in the pattern image 300.

For example, when sizes of the pattern image 300 and the display image are the same, the second controller 250 divides the display image with the same setting as the setting of the first region 310 and the second region 320 obtained by dividing the pattern image 300 and generates the third region and the fourth region.

When the sizes of the pattern image 300 and the display image are similar sizes, the second controller 250 divides the display image based on the setting of the first region 310 and the second region 320 obtained by dividing the pattern image 300 and a similarity ratio of the pattern image 300 and the display image and generates the third region and the fourth region.

Subsequently, the second controller 250 corrects the third region using the first correction parameter. The second controller 250 corrects the fourth region using the second correction parameter.

Subsequently, the second controller 250 combines the corrected third region and the corrected fourth region to generate a display image.

After generating the display image, the second controller 250 transmits the generated display image to the projector 100A. The projector 100A generates image light based on the received display image and projects the generated image light onto the projection surface 30. Consequently, the display image corrected by the first correction parameter and the second correction parameter is displayed on the projection surface 30.

4. Operation of the Information Processing Apparatus in the First Embodiment

Figure 13:
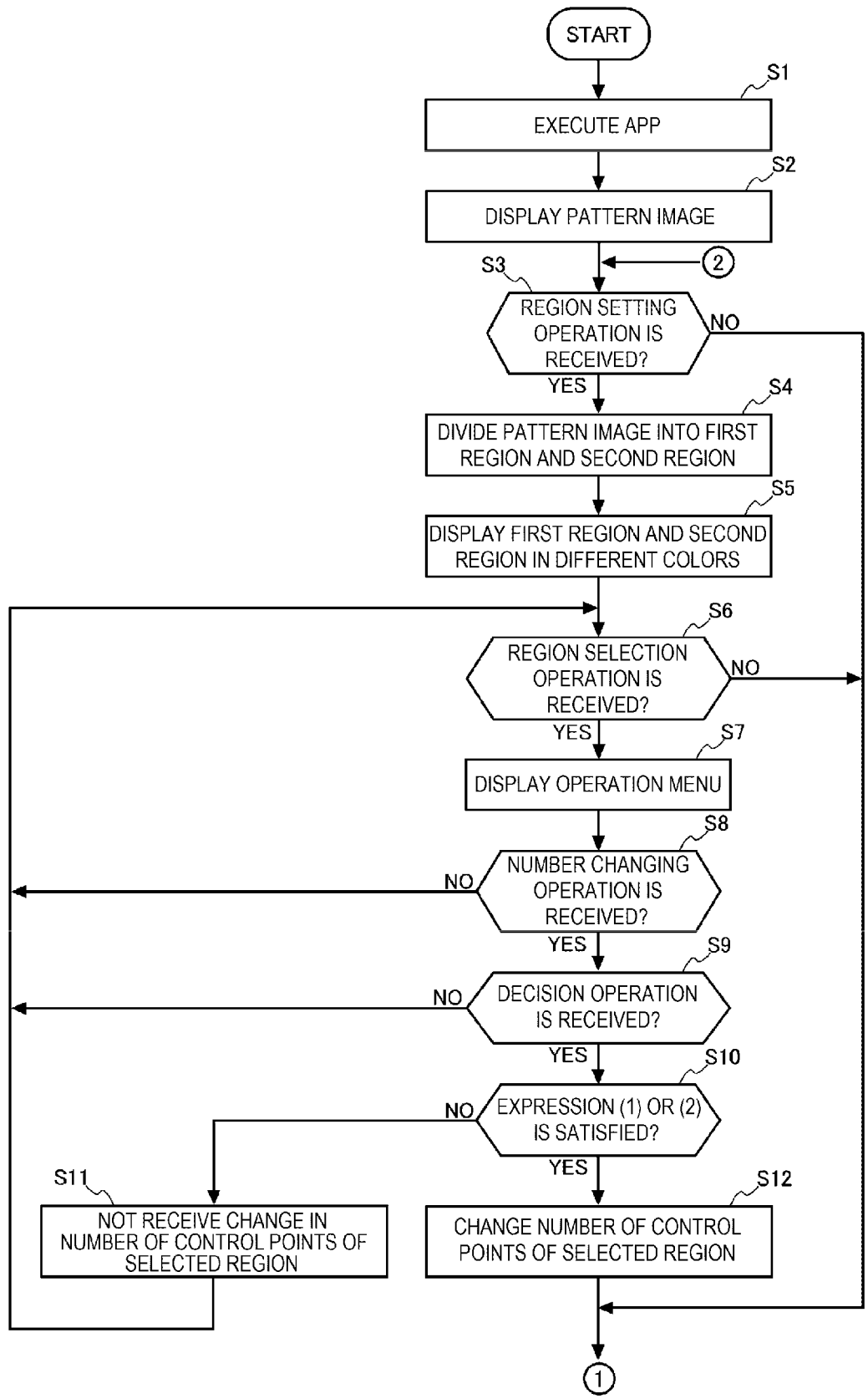
FIG. 13 is a flowchart showing an operation of the information processing apparatus.
Figure 14:
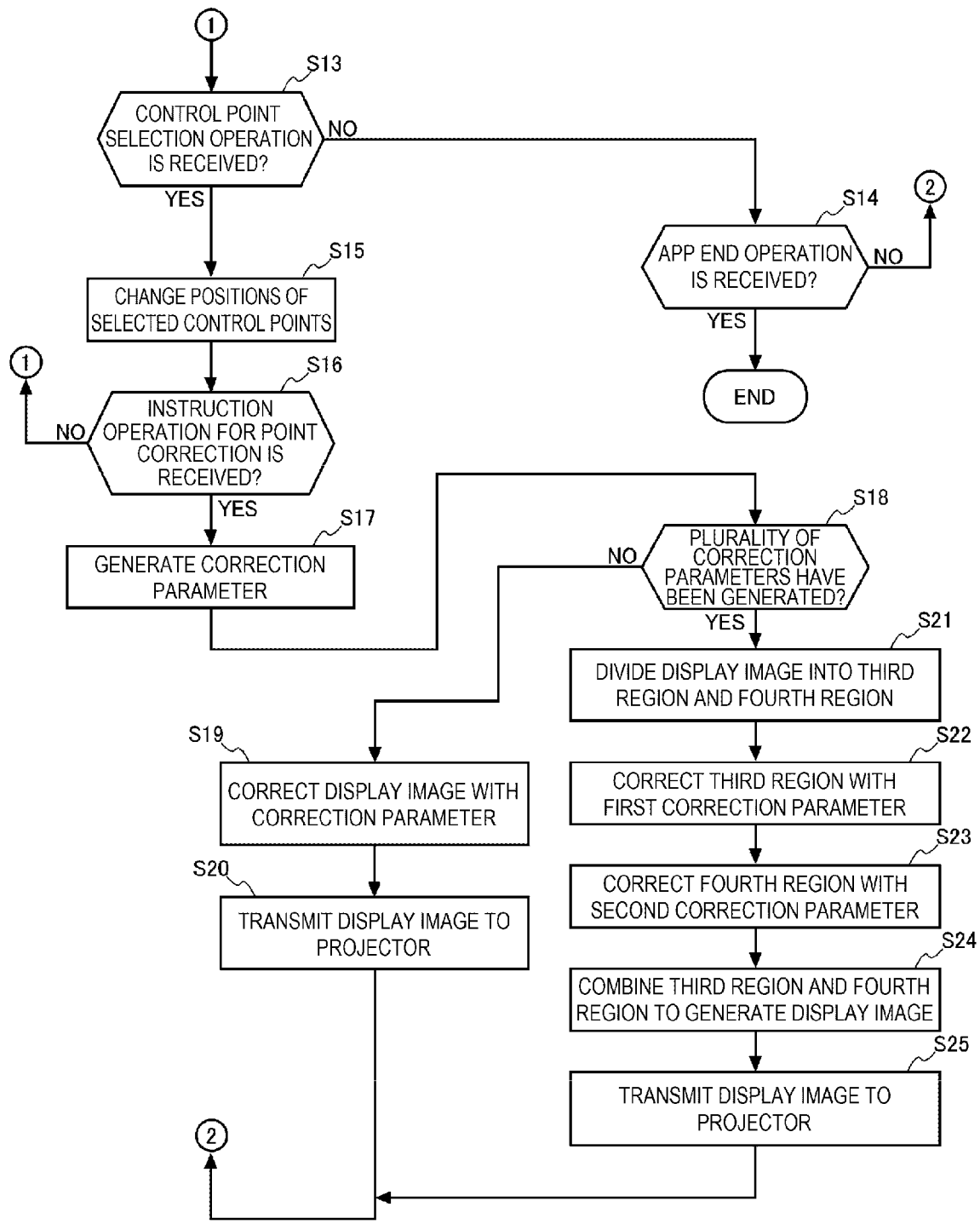
FIG. 14 is a flowchart showing the operation of the information processing apparatus.

FIGS. 13 and 14 are flowcharts showing an operation of the information processing apparatus 200.

The operation of the information processing apparatus 200 is explained with reference to the flowcharts of FIGS. 13 and 14.

When receiving, with the touch panel 220 or the operation unit 230, operation for selecting the APP 263, the second controller 250 executes the APP 263 (step S1) and causes the touch panel 220 to display the application screen 225. When the point correction is selected by menu operation of the application screen 225, the second controller 250 causes the application screen 225 to display the pattern image 300 (step S2).

Subsequently, the second controller 250 determines whether region setting operation for dividing the pattern image 300 into a plurality of regions has been received (step S3). When the region setting operation has not been received (NO in step S3), the second controller 250 shifts to determination in step S13 shown in FIG. 14.

When the region setting operation has been received (YES in step S3), the second controller 250 divides the pattern image 300 into the first region 310 and the second region 320 according to the received operation (step S4).

Subsequently, the second controller 250 changes a display form of the first region 310 and the second region 320. The second controller 250 displays the second region 320 or control points included in the second region 320 in colors different from a display color of the first region 310 or a display color of control points included in the first region 310 (step S5).

Subsequently, the second controller 250 determines whether region selection operation has been received (step S6). That is, the second controller 250 determines whether operation for selecting one of the first region 310 and the second region 320 has been received. When the region selection operation has not been received (NO in step S6), the second controller 250 shifts to the determination in step S13 shown in FIG. 14.

When the region selection operation has been received (YES in step S6), the second controller 250 causes the application screen 225 to display an operation menu capable of changing the number of control points of the first region 310 or the second region 320 selected by the region selection operation (step S7).

Subsequently, the second controller 250 determines whether number changing operation has been received by the operation menu displayed in step S7 (step S8). The second controller 250 determines whether the operation for changing the number of control points included in the first region 310 or the second region 320 selected in step S6 has been received. For example, when a return button or the like displayed on the application screen 225 has been pressed and the changing operation for changing the number of control points has not been received (NO in step S8), the second controller 250 returns to the determination in step S6.

When the number changing operation has been received (YES in step S8), subsequently, the second controller 250 determines whether decision operation has been received (step S9). For example, when the return button or the like displayed on the application screen 225 has been pressed and the decision operation has not been received (NO in step S9), the second controller 250 returns to the determination in step S6.

When the decision operation has been received (YES in step S9), the second controller 250 determines whether the relation of Expression (1) or (2) described above is satisfied (step S10).

For example, it is assumed that the region of the pattern image 300 has been divided into the first region 310 and the second region 320 shown in FIG. 11 and the number of control points of the second region 320 has been changed. In this case, the second controller 250 specifies sides to be boundaries of the first region 310 and the second region 320 and counts the numbers of control points on the specified sides.

In the example shown in FIG. 11, the side to be the boundary of the first region 310 is the right side 311 in the drawing view and the side to be the boundary of the second region 320 is the left side 321 in the drawing view. The number of control points on the right side 311 is twelve and the number of control points on the left side 321 is twenty-three. Therefore, the second controller 250 determines that the number of control points of the second region 320 after the change satisfies the relation of Expression (1) described above (YES in step S10), permits a change in the number of control points of the second region 320, and changes the number of control points of the second region 320 (step S12).

When the number of control points of the second region 320 after the change does not satisfy the relation of Expression (1) or (2) described above (NO in step S10), the second controller 250 does not permit a change in the number of control points of the second region 320. That is, the second controller 250 does not receive a change in the number of control points of the second region 320 (step S11) and returns to the determination in step S6.

The operation of the information processing apparatus 200 is continuously explained with reference to the flowchart of FIG. 14.

Subsequently, the second controller 250 determines whether control point selection operation has been received (step S13). The second controller 250 determines whether operation including selection of control points moving in positions on the pattern image 300 and designation of positions after the movement of the selected moving control points has been received. When the control point selection operation has not been received (NO in step S13), the second controller 250 determines whether end operation for ending the APP 263 has been received by the touch panel 220 or the operation unit 230 (step S14).

When the end operation for ending the APP 263 has been received (YES in step S14), the second controller 250 ends the APP 263 and ends this processing flow.

When the end operation for ending the APP 263 has not been received (NO in step S14), the second controller 250 returns to the determination in step S3 and determines whether region setting operation has been received (step S3).

When the control point selection operation has been received (YES in step S13), the second controller 250 changes the positions in the pattern image 300 of the control points changed by the control point selection operation (step S15)

Subsequently, the second controller 250 determines whether the instruction operation for instructing execution of the point correction has been received (step S16). When the instruction operation for instructing execution of the point correction has not been received (NO in step S16), the second controller 250 returns to the determination in step S13.

When the instruction operation for instructing execution of the point correction has been received (YES in step S16), the second controller 250 generates a correction parameter based on positions in the pattern image 300 before the change of the control points and positions in the pattern image 300 after the change (step S17).

When the pattern image 300 is divided into the first region 310 and the second region 320 in step S4, the second controller 250 generates a first correction parameter based on positions before the movement and positions after the movement of control points included in the first region 310. The second controller 250 generates a second correction parameter based on positions before the movement and positions after the movement of the control points included in the second region 320.

Subsequently, the second controller 250 determines whether a plurality of correction parameters have been generated in step S17 (step S18). That is, the second controller 250 determines whether a first correction parameter and a second correction parameter have been generated.

When a plurality of correction parameters have not been generated in step S17 (NO in step S18), the second controller 250 corrects a display image with the correction parameter generated in step S17 (step S19). The second controller 250 transmits the corrected display image to the projector 100A (step S20) and causes the projector 100A to display the display image. Thereafter, the second controller 250 returns to the determination in step S3.

When a plurality of correction parameters have been generated in step S17 (YES in step S18), the second controller 250 divides the display image into a third region and a fourth region (step S21). The second controller 250 divides the display image into the third region and the fourth region based on setting of the first region 310 and the second region 320 in the pattern image 300.

Subsequently, the second controller 250 corrects the third region using the first correction parameter (step S22). The second controller 250 corrects the fourth region using the second correction parameter (step S23).

Subsequently, the second controller 250 combines the corrected third region and the corrected fourth region to generate a display image (step S24). The second controller 250 transmits the generated display image to the projector 100A (step S25) and causes the projector 100A to display the display image. Thereafter, the second controller 250 returns to the determination in step S3.

5. Configuration of a Projector in a Second Embodiment

In the first embodiment explained above, the information processing apparatus 200 receives the operation for displaying the pattern image 300 and dividing the pattern image 300 into a plurality of regions and operation for changing the positions of the control points and generates the correction parameter based on the positions before the change and after the change of the control points. In a second embodiment, the processing performed by the information processing apparatus 200 is carried out in a projector 100B.

Figure 15:
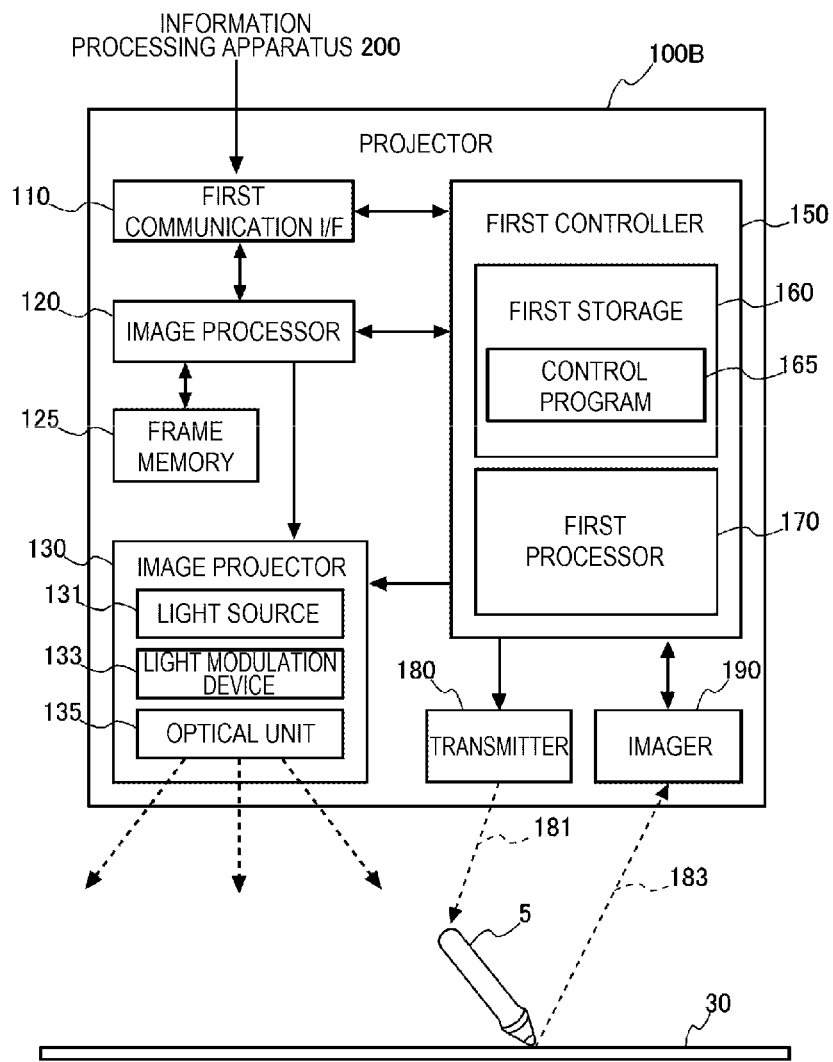
FIG. 15 is a block diagram showing a configuration of a projector in a second embodiment.

FIG. 15 is a block diagram showing a configuration of the projector 100B in the second embodiment.

The configuration of the projector 100B is explained with reference to FIG. 15. Explanation about the same components as the components of the projector 100A shown in FIG. 2 is omitted.

The projector 100B includes a transmitter 180 and an imager 190. The projector 100B detects, from a captured image captured by the imager 190, a pointed position of the projection surface 30 pointed by an electronic pen 5.

The transmitter 180 includes a light source such as an LED (Light-Emitting Diode) and a control device that controls ON and OFF of the light source. The control device can be configured by, for example, an ASIC or an FPGA. Illustration of the light source and the control device is omitted.

The transmitter 180 outputs first signal light 181, which is a signal for synchronizing light emission timing of the electronic pen 5 with imaging timing of the imager 190. The first signal light 181 is a signal of near infrared light receivable by the electronic pen 5. The transmitter 180 periodically transmits the first signal light 181 during the operation of the projector 100B. The first signal light 181 is a control signal for instructing timing for causing the electronic pen 5 to transmit second signal light 183. The second signal light 183 is near infrared light having a predetermined light emission pattern. The electronic pen 5 emits the second signal light 183, for example, in synchronization with timing when the first signal light 181 is received. The projector 100B causes the imager 190 to execute imaging according to timing when the electronic pen 5 emits the second signal light 183.

The imager 190 is a camera including a not-shown imaging element such as a CCD (Charge Coupled Device) sensor or a CMOS (Complementary Metal Oxide Semiconductor) sensor. The imager 190 includes an infrared transmission filter that absorbs visible light and transmits infrared light. The imager 190 images, via the infrared transmission filter, infrared light emitted from the electronic pen 5. The imager 190 repeats the imaging of the projection surface 30 based on the control by the first controller 150 and sequentially outputs a captured image, which is an imaging result, to the first controller 150.

The first controller 150 detects infrared light emitted by the electronic pen 5 from the captured image input from the imager 190. The first controller 150 regards, as light emitted by the electronic pen 5, an image having brightness equal to or larger than a predetermined threshold and having size within a predetermined range among images of the infrared light included in the captured image. The first controller 150 detects, based on a position of the light emitted by the electronic pen 5 in the captured image, a position of the projection surface 30 pointed by the electronic pen 5. The first controller 150 discriminates a light emission sequence of the electronic pen 5 based on captured images acquired a plurality of times and detects presence or absence of a touch on the projection surface 30.

While the electronic pen 5 is operating, the electronic pen 5 repeats flashing in a predetermined light emission sequence. The electronic pen 5 changes the light emission sequence according to presence or absence of a touch on the projection surface 30. Therefore, the projector 100B can identify, based on the light emission sequence of a light emitter, presence or absence of a touch by the electronic pen 5.

The first controller 150 detects a position of the projection surface 30 pointed by the electronic pen 5 and detects operation input by the electronic pen 5. The operation detected by the first controller 150 includes the region setting operation in step S3, the region selection operation in step S6, the number changing operation in step S8, the control point selection operation in step S13, and the instruction operation for the point correction in step S16 shown in the flowchart of FIG. 13. The configuration in which the operation input by the electronic pen 5 is used is illustrated. However, not only this, but operation by a not-shown remote controller may be used.

The first controller 150 executes the processing conforming to the flowcharts of FIGS. 13 and 14 and generates the first correction parameter and the second correction parameter. When receiving the display image from the information processing apparatus 200, the first controller 150 divides the received display image into the third region and the fourth region. The first controller 150 corrects the divided third region using the first correction parameter and corrects the divided fourth region using the second correction parameter.

The first controller 150 combines the corrected third region and the corrected fourth region to generate a display image. The first controller 150 generates, with the image projector 130, image light based on the generated display image and projects the generated image light onto the projection surface 30. Consequently, a display image subjected to the point correction is displayed on the projection surface 30.

6. Summary of the Present Disclosure

A summary of the present disclosure is noted below.
Note 1

A display method including: receiving first operation for dividing a region of a first image including a plurality of control points into a plurality of regions including a first region and a second region; receiving second operation for changing a number of control points included in at least one of the first region and the second region; receiving, in the at least one region of the first region and the second region, third operation including selection of one or more control points in the first image and designation of positions after the movement of the one or more control points; correcting a second image based on positions in the first image before the movement of the one or more control points and positions after the movement of the one or more control points in the first image; and displaying, by a display apparatus, the second image on a display surface.

Consequently, the number of control points included in at least one of the first region and the second region is changed. Therefore, when the second image displayed on the display surface by the display apparatus is corrected by changing the positions of the control points included in the first image, it is possible to set an optimum number of control points according to a shape of the display surface. Therefore, it is possible to improve convenience of a user.
Note 2

The display method described in Note 1, further including displaying the first region and the second region in different display forms.

Consequently, the first region and the second region are displayed in the different display forms. Therefore, the user who visually recognizes the first image can easily distinguish the first region and the second region.
Note 3

The display method described in Note 1 or Note 2, further including displaying, in different display forms, a plurality of control points included in the first region and a plurality of control points included in the second region.

Consequently, the plurality of control points included in the first region and the plurality of control points included in the second region are displayed in the different display forms. Therefore, the user who visually recognizes the first image can easily distinguish the first region and the second region.
Note 4

The display method described in any one of Notes 1 to 3, wherein the receiving the first operation includes receiving operation for dividing the region of the first image into the second region and the first region, which is a region of the first image other than the second region.

Consequently, the region of the first image is divided into two regions of the first region and the second region. Therefore, the second image displayed on the display surface by the display apparatus is corrected by changing the positions of the control points included in the first image, it is possible to divide the first image into the first region and the second region according to a shape of the display surface.

The display method described in Note 4, wherein the receiving the first operation includes: receiving selection of control points of the second region from the plurality of control points; setting the second region in the first image based on arrangement of the control points of the second region in the first image; and setting the first region in the first image based on arrangement of control points other than the control points of the second region in the first image.

Consequently, the first region and the second region are set by selecting the control points of the second region out of the plurality of control points. Therefore, it is possible to set the first region and the second region with one operation for selecting the control points of the second region. It is possible to simplify operation.
Note 6

The display method described in Note 4 or 5, wherein the correcting the second image includes: generating a first correction parameter based on the one or more control points included in the first region and the positions after the movement of the one or more control points included in the first region; generating a second correction parameter based on the moving one or more control points included in the second region and the positions after the movement of the one or more control points included in the second region; dividing the second image into a third region and a fourth region based on the first region and the second region in the first image; correcting the third region using the first correction parameter; correcting the fourth region using the second correction parameter; and combining the third region and the fourth region.

Consequently, it is possible to generate a correction parameter for each region of the divided first image. Therefore, it is possible to improve accuracy of the correction of the second image.
Note 7

The display method described in any one of Notes 1 to 6, wherein the first region and the second region are in contact in a first side of the first region and a second side of the second region, and the receiving the second operation includes receiving operation for changing a number of control points of the second region to satisfy a relation of Expression (1) described below:

$$N=TM-1 \text{ or } M=TN-1 \qquad (1)$$

where N represents a number in the second side of control points of the second region changed by the second operation, M represents a number of the control points in the first side of the first region, and T is any natural number.

Consequently, it is possible to eliminate, in boundaries of the first region and the second region, deviation between positions of a control point on the first side of the first region and a control point on the second side of the second region. Therefore, when the position of the control point on the second side of the second region is changed, the position of the control point on the first side of the first region is also changed. When the position of the control point on the first side of the first region is changed, the position of the control point on the second side of the second region is also changed.
Note 8

The display method described in any one of Notes 1 to 6, wherein the second region is surrounded by the first region, the first region and the second region are in contact in a line segment of the first region and a second side of the second region, and the receiving the second operation includes receiving operation for changing a number of control points of the second region to satisfy a relation of Expression (1) described below:

$$N=TM-1 \text{ or } M=TN-1 \qquad (1)$$

where N represents a number in the second side of control points of the second region changed by the second operation, M represents a number of the control points in the line segment of the first region, and T is any natural number.

Consequently, it is possible to eliminate, in boundaries of the first region and the second region, deviation between positions of a control point on the line segment of the first region and a control point on the second side of the second region. Therefore, when the position of the control point on the second side of the second region is changed, the position of the control point on the line segment of the first region is also changed. When the position of the control point on the line segment of the first region is changed, the position of the control point on the second side of the second region is also changed.

Note 9

The display method described in Note 7 or 8, wherein the receiving the second operation includes not receiving, as the second operation, operation not satisfying the relation of Expression (1) described above.

Consequently, it is possible not to receive, as the second operation, operation in which at least a part of the control points in the second side of the second region does not coincide with the control points in the first side of the first region. It is possible not to receive, as the second operation, operation in which at least a part of the control points in the first side of the first region does not coincide with the control points in the second side of the second region.

Note 10

The display method described in Note 7 or 8, wherein the receiving the second operation includes performing a notification operation when operation not satisfying the relation of Expression (1) described above is input.

Consequently, it is possible to notify, with a notifier, operation in which at least a part of the control points in the second side of the second region does not coincide with the control points in the first side of the first region. It is possible to notify, with the notifier, operation in which at least a part of the control points in the first side of the first region does not coincide with the control points in the second side of the second region.

Note 11

A display apparatus including: a display panel configured to display an image on a display surface; and one or more processors configured to execute: receiving first operation for dividing a region of a first image including a plurality of control points into a plurality of regions including a first region and a second region; receiving second operation for changing a number of control points included in at least one of the first region and the second region; receiving, in the at least one region of the first region and the second region, third operation including selection of one or more control points in the first image and designation of positions after the movement of the one or more control points; correcting a second image based on positions in the first image before the movement of the one or more control points and positions after the movement of the one or more control points in the first image; and causing the display panel to display the second image on the display surface.

Consequently, the number of control points included in at least one of the first region and the second region is changed. Therefore, when the second image displayed on the display surface by the display apparatus is corrected by changing the positions of the control points included in the first image, it is possible to set an optimum number of control points according to a shape of the display surface. Therefore, it is possible to improve convenience of a user.

Note 12

A non-transitory computer-readable storage medium storing a program, the program causing a computer to execute: receiving first operation for dividing a region of a first image including a plurality of control points into a plurality of regions including a first region and a second region; receiving second operation for changing a number of control points included in at least one of the first region and the second region; receiving, in the at least one region of the first region and the second region, third operation including selection of one or more control points in the first image and designation of positions after the movement of the one or more control points; correcting a second image based on positions in the first image before the movement of the one or more control points and positions after the movement of the one or more control points in the first image; and causing a display apparatus to display the second image on a display surface.

Consequently, the number of control points included in at least one of the first region and the second region is changed. Therefore, when the second image displayed on the display surface by the display apparatus is corrected by changing the positions of the control points included in the first image, it is possible to set an optimum number of control points according to a shape of the display surface. Therefore, it is possible to improve convenience of a user.

7. Other Embodiments

The embodiments explained above are preferred implementation modes of the present disclosure. However, the embodiments are not limited to the modes explained above. Various modified implementations are possible within a range not departing from the gist of the present disclosure.

For example, in the first embodiment and the second embodiment explained above, the method of, when dividing the region of the pattern image 300, dividing the region such that the shape of the first region 310 and the second region 320 is a rectangle is explained. However, the shape of the first region 310 and the second region 320 is not limited to the rectangle. For example, the shape can be set to any shape such as a circle or a polygon.

In the examples shown in FIGS. 4 to 12, the pattern image 300 in which the plurality of control points are arrange in a lattice shape is shown. However, the arrangement of the plurality of control points may not be the lattice shape. For example, intervals among the control points in the first region 310 or the second region 320 may be different.

The functional units of the information processing apparatus 200 shown in FIG. 3 indicate functional configurations. A specific implementation mode of the functional units is not particularly limited. That is, hardware individually corresponding to the functional units does not always need to be implemented. It is also naturally possible to adopt a configuration in which one processor executes a program to realize functions of a plurality of functional units. A part of functions realized by software in the embodiments may be realized by hardware. A part of functions realized by hardware in the embodiments may be realized by software.

Besides, specific detailed configurations of the other units of the projector can also be optionally changed in a range not departing from the gist of the present disclosure.

The functional units of the projectors 100A and 100B shown in FIGS. 2 and 15 indicate functional configurations. A specific implementation form of the functional units is not particularly limited. That is, hardware individually corresponding to the functional units does not always need to be implemented. It is also naturally possible to adopt a configuration in which one processor executes a program to realize functions of a plurality of functional units. A part of functions realized by software in the embodiments may be realized by hardware. A part of functions realized by hardware in the embodiments may be realized by software. Besides, specific detailed configurations of the other units of the projector can also optionally changed in a range not departing from the gist of the present disclosure.

Processing units of the flowcharts of FIGS. 13 and 14 are divided according to main processing contents in order to make it easy to understand the processing of the information processing apparatus 200. The present disclosure is not limited by a way of division and names of the processing units shown in the flowcharts of FIGS. 13 and 14. The processing of the second controller 250 can be divided into a larger number of processing units according to processing contents and can be divided such that one processing unit includes a larger number of kinds of processing. The processing order of the flowcharts is not limited to the illustrated example.

In the first embodiment explained above, the projector 100A is used as the display apparatus. However, the display apparatus is not limited to the projector 100A. For example, the display apparatus may be a display such as a liquid crystal display, an organic EL display, or a plasma display. When the display is used, the transmitter 180 and the imager 190 may be provided in the display and the position of the electronic pen 5 may be detected by the display. A display surface of the liquid crystal panel, the organic EL panel, or the like may be configured as a touch panel including a display panel and a touch sensor. The touch panel may be caused to detect a touch position on the display surface.

When the display method is realized using a computer included in the information processing apparatus 200 or a computer included in the projector 100B, a program that these computers are caused to execute can also be configured in a form of a recording medium. Alternatively, the program that these computers are caused to execute can also be configured in a form of a transmission medium for transmitting the program. As the recording medium, a magnetic or optical recording medium or a semiconductor memory device can be used. Specifically, examples of the recording medium include a portable or stationary recording medium such as a flexible disk, a HDD, a CD-ROM, a DVD (Digital Versatile Disc), a Blu-ray Disc, a magneto-optical disk, a flash memory, or a card type recording medium. The recording medium may be a nonvolatile storage device such as a RAM, a ROM, or a HDD, which are an internal storage device included in a server apparatus. Blu-ray is a registered trademark.

In the embodiments explained above, as shown in step S10, the number of control points on the side where the first region 310 and the second region 320 are in contact is counted and it is determined whether the relation of Expression (1) or (2) is satisfied and, then, a change in the number of control points is received. However, not only this, but, for example, the determination in step S10 may not be performed and the number of control points may be able to be changed in cases including a case in which the relation of Expression (1) or (2) is not satisfied.

When the relation of Expression (1) or (2) is satisfied, since at least a part of respective control point groups present on the sides of the first region 310 and the second region 320 coincides with a part of the other control point group, it is possible to associate movements of these control points. Therefore, although the configuration of the embodiments explained above is more preferable, it is naturally possible not to perform the determination in step S10 according to a use by the user.

What is claimed is:

1. A display method comprising:
receiving first operation for dividing a region of a first image including a plurality of control points into a plurality of regions including a first region and a second region;
receiving second operation for changing a number of control points included in at least one of the first region and the second region;
receiving, in the at least one region of the first region and the second region, third operation including selection of one or more control points in the first image and designation of positions after the movement of the one or more control points;
correcting a second image based on positions in the first image before the movement of the one or more control points and positions after the movement of the one or more control points in the first image; and
displaying, by a display apparatus, the second image on a display surface.

2. The display method according to claim 1, further comprising displaying the first region and the second region in different display forms.

3. The display method according to claim 1, further comprising displaying, in different display forms, a plurality of control points included in the first region and a plurality of control points included in the second region.

4. The display method according to claim 1, wherein the receiving the first operation includes receiving operation for dividing the region of the first image into the second region and the first region which is a region of the first image other than the second region.

5. The display method according to claim 4, wherein the receiving the first operation includes:
receiving selection of control points of the second region from the plurality of control points;
setting the second region in the first image based on arrangement of the control points of the second region in the first image; and
setting the first region in the first image based on arrangement of control points other than the control points of the second region in the first image.

6. The display method according to claim 4, wherein the correcting the second image includes:
generating a first correction parameter based on the one or more control points included in the first region and the positions after the movement of the one or more control points included in the first region;
generating a second correction parameter based on the one or more control points included in the second region and the positions after the movement of the one or more control points included in the second region;
dividing the second image into a third region and a fourth region based on the first region and the second region in the first image;

correcting the third region using the first correction parameter;

correcting the fourth region using the second correction parameter; and combining the third region and the fourth region.

7. The display method according to claim 1, wherein the first region and the second region are in contact in a first side of the first region and a second side of the second region, and the receiving the second operation includes receiving operation for changing a number of control points of the second region to satisfy a relation of Expression (1) described below:

$$N=TM-1 \text{ or } M=TN-1 \qquad (1)$$

where N represents a number in the second side of control points of the second region changed by the second operation, M represents a number of the control points in the first side of the first region, and T is any natural number.

8. The display method according to claim 1, wherein the second region is surrounded by the first region, the first region and the second region are in contact in a line segment of the first region and a second side of the second region, and the receiving the second operation includes receiving operation for changing a number of control points of the second region to satisfy a relation of Expression (1) described below:

$$N=TM-1 \text{ or } M=TN-1 \qquad (1)$$

where N represents a number in the second side of control points of the second region changed by the second operation, M represents a number of the control points in the line segment of the first region, and T is any natural number.

9. The display method according to claim 7, wherein the receiving the second operation includes not receiving, as the second operation, operation not satisfying the relation of the Expression (1).

10. The display method according to claim 7, wherein the receiving the second operation includes performing a notification operation when operation not satisfying the relation of the Expression (1) is input.

11. A display apparatus comprising:

a display panel which displays an image on a display surface; and one or more processors programmed to execute:

receiving first operation for dividing a region of a first image including a plurality of control points into a plurality of regions including a first region and a second region;

receiving second operation for changing a number of control points included in at least one of the first region and the second region;

receiving, in the at least one region of the first region and the second region, third operation including selection of one or more control points in the first image and designation of positions after the movement of the one or more control points;

correcting a second image based on positions in the first image before the movement of the one or more control points and positions after the movement of the one or more control points in the first image; and causing the display panel to display the second image on the display surface.

12. A non-transitory computer-readable storage medium storing a program, the program causing a computer to execute:

receiving first operation for dividing a region of a first image including a plurality of control points into a plurality of regions including a first region and a second region;

receiving second operation for changing a number of control points included in at least one of the first region and the second region;

receiving, in the at least one region of the first region and the second region, third operation including selection of one or more control points in the first image and designation of positions after the movement of the one or more control points;

correcting a second image based on positions in the first image before the movement of the one or more control points and positions after the movement of the one or more control points in the first image; and causing a display apparatus to display the second image on a display surface.

* * * * *